United States Patent [19]

Gordon

[11] Patent Number: 5,740,575
[45] Date of Patent: Apr. 21, 1998

[54] RAMP SYSTEMS

[76] Inventor: Julian D. Gordon, 8 Trager Rd., Marblehead, Mass. 02127

[21] Appl. No.: 536,425

[22] Filed: Sep. 29, 1995

[51] Int. Cl.⁶ .................................................. E01D 19/00
[52] U.S. Cl. ........................ 14/69.5; 14/69.5; 14/73; 254/88; 182/182
[58] Field of Search ........................ 14/3, 4, 5, 6, 14, 14/15, 73, 73.1, 75, 2.4, 69.5, 71.1; 52/299; 182/113, 130, 181, 182, 222; 254/88; 414/537; 404/1

[56] References Cited

U.S. PATENT DOCUMENTS

| | | | |
|---|---|---|---|
| 430,141 | 6/1890 | Myers | 182/181 |
| 1,715,260 | 5/1929 | Weber | 182/182 |
| 3,355,037 | 11/1967 | Dodd | 414/537 X |
| 3,666,045 | 5/1972 | Olsen | 182/222 X |
| 4,120,485 | 10/1978 | McConnell | 254/88 |
| 4,240,522 | 12/1980 | Spear et al. | 182/182 X |
| 4,937,989 | 7/1990 | Miyares et al. | 182/182 X |
| 5,001,798 | 3/1991 | Hamilton | 14/69.5 |
| 5,287,579 | 2/1994 | Estevez, Jr. | 14/71.1 |
| 5,325,558 | 7/1994 | Labreche | 414/537 |

FOREIGN PATENT DOCUMENTS 1175465  11/1958  France ........................ 14/69.5

*Primary Examiner*—James Lisehora
*Attorney, Agent, or Firm*—Wolf, Greenfield & Sacks, P.C.

[57] ABSTRACT

A ramp system made up of any selected member ramp sections connected together, end to end, by stands. The ramp sections have depending flanges at each end that engage retaining rails in the stands. The height of the rails in the stands can be varied to accommodate the terrain spanned by the system.

14 Claims, 4 Drawing Sheets

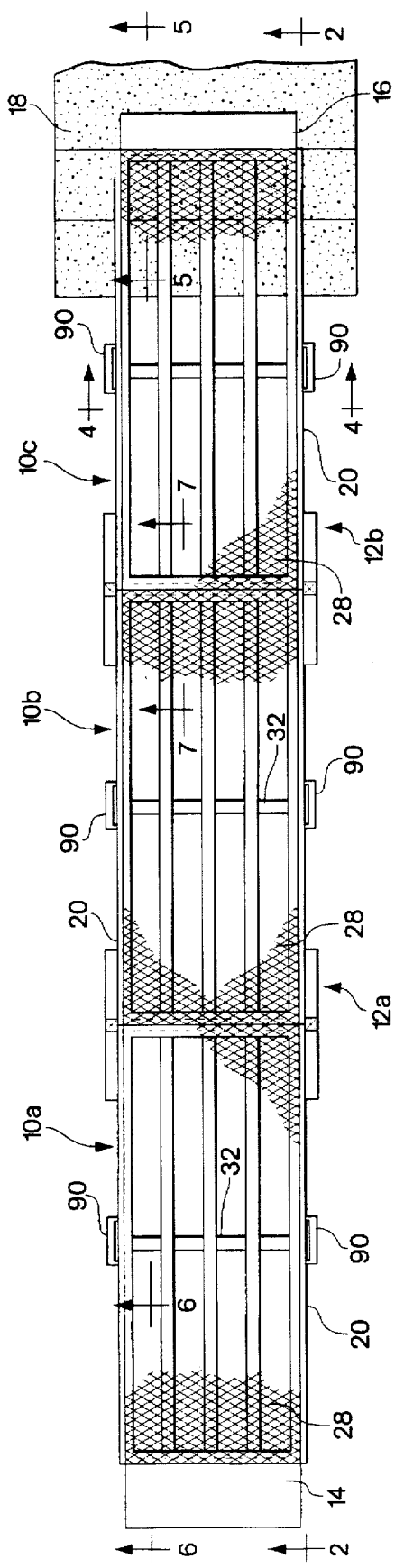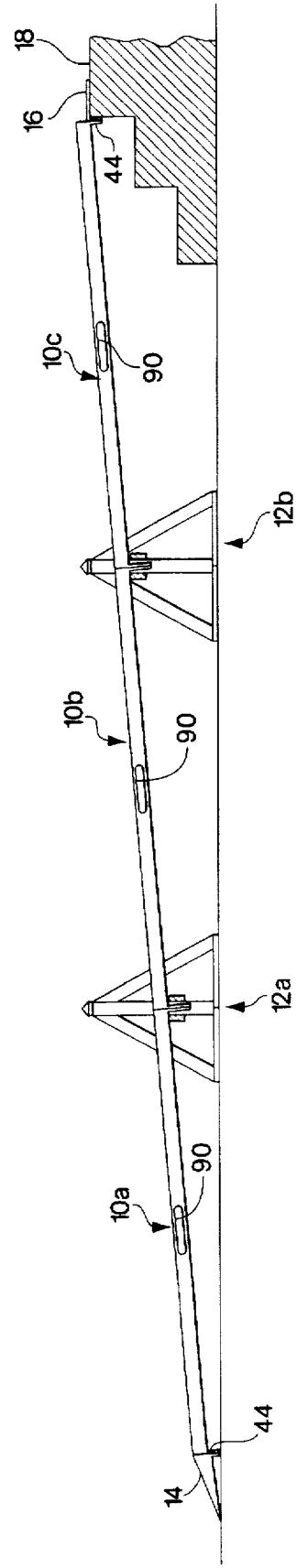

RAMP SYSTEMS

This invention relates to ramp systems for the disabled as well as for the general population in crossing difficult terrain such as steep, icy driveways, steps, etc. More particularly, the invention relates to such ramps that are modular in construction so as to enable a number of ramp sections to be connected end to end to suit any application.

One important object of the present invention is to provide a non-skid modular ramp system that can be constructed to any desired length and to cross terrain of varied elevation and which can be assembled and disassembled very easily.

Another important object of the present invention is to provide a ramp system that can be disassembled for storage in a small space.

Another important object of the present invention is to provide a ramp system that can be assembled with or without handrails as desired by the user.

Another important object of the present invention is to provide a portable ramp system that is fully adjustable so that it can be used to cross varied terrain.

To accomplish these and other objects, the ramp system of the present invention is made up of a plurality of ramp sections each having a non-skid steel grate deck and a steel frame. The ramp sections are connected end to end by means of stands which also serve to support the adjacent ends at the desired elevation above the ground. The stands themselves are adjustable so that the elevation at the adjacent ends of the sections can be at any desired height above the ground. The stands may also be made in different sizes to further provide for the height adjustment of the ramp sections. The extreme ends of the ramp made up of a plurality of a ramp sections carry a transition flanges so that a wheel chair or other wheeled device such as carriage, cart, etc. can move on and off the ramp without difficulty or severe jouncing. The ends of the ramp sections connected together at the stands carry downwardly mounting extending flanges that engage cross members on the stand so that the ramp sections can be joined together simply by placing the ramp section ends over the cross members with the downwardly extending flanges of the ramp sections closely adjacent one another between the cross members. The ramp section frames are provided with conveniently placed holes that enable vertical post of a handrail subassembly to be secured to the ramp so that handrails may be easily mounted on it. The ramp sections are also provided with handles on the sides of their frames so that the sections may be lifted easily by two people, one on each side, when assembling or disassembling the ramp system.

The present invention will be better understood and appreciated from the following detailed description of the preferred embodiment thereof, selected for purposes of illustration and shown in the accompanying drawings.

BRIEF FIGURE DESCRIPTIONS

FIG. 2 is a side elevation view of an erected ramp system made up of three ramp sections and two stands, in accordance with the present invention;

FIG. 3 is a top plan view of the ramp system shown in FIG. 2;

DETAILED DESCRIPTION

Figure 1:
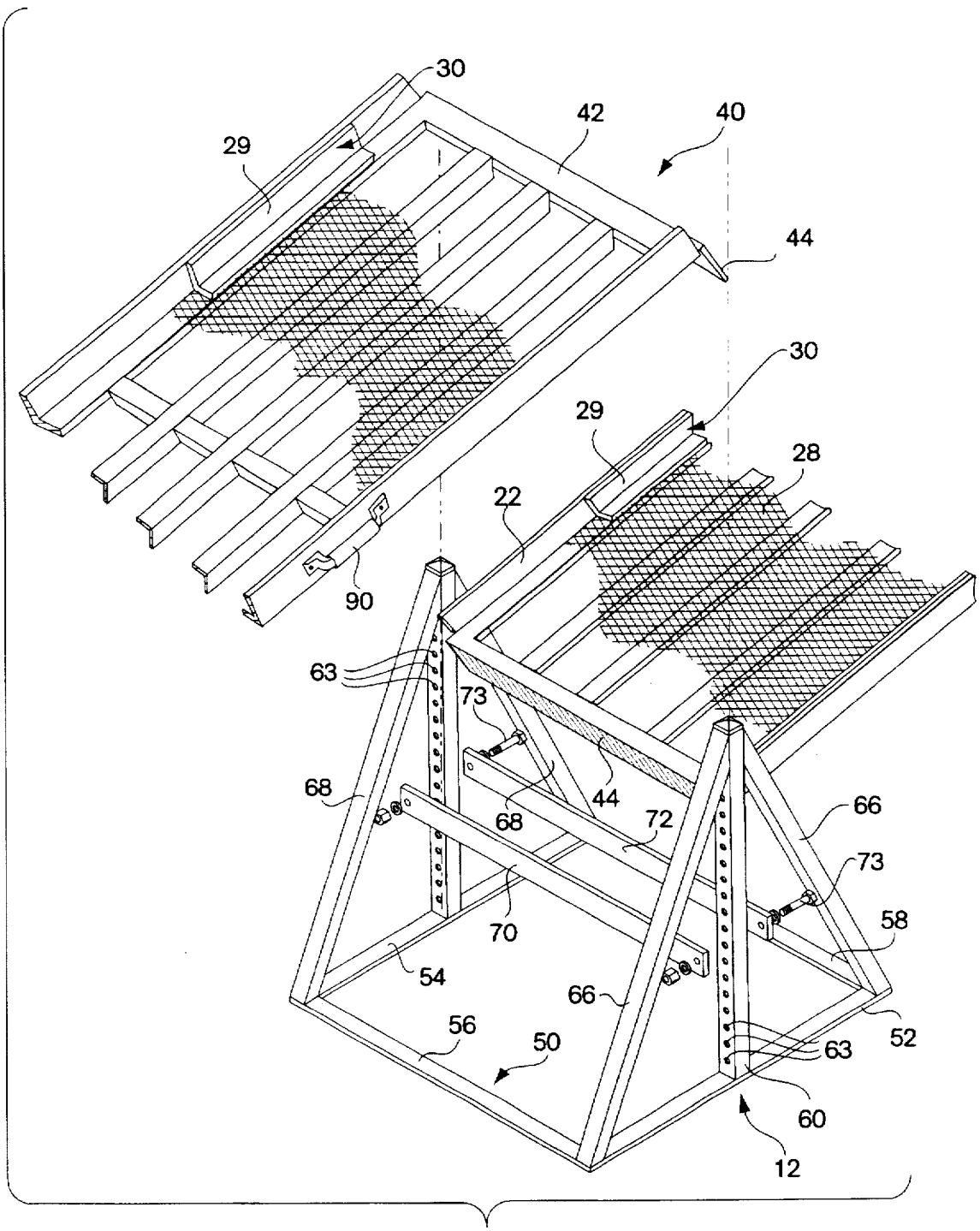
FIG. 1 is a fragmentary exploded view of one stand and a pair of ramp sections, constructed in accordance with the present invention.

The ramp system of the present invention shown assembled in FIGS. 2 and 3 is made up of a number of ramp sections 10 separately identified as 10a, 10b and 10c and supported intermediate its ends by a pair of stands 12a and 12b. In this assembly, the left end of the left ramp section 10a is provided with a transition flange 14 while the right end of the right ramp section 10c carries a transition flange 16. It is apparent from an inspection of FIG. 2 that the transition flanges 14 and 16 serve to smooth the transition from the ground to the lower or first ramp section 10a while the flange 16 supports and smooths the transition from the upper end of the assembled ramp to the stair landing 18. Also in FIG. 2, the stands 12 are shown to support the adjacent ends of the ramps at different elevations.

Figure 4:
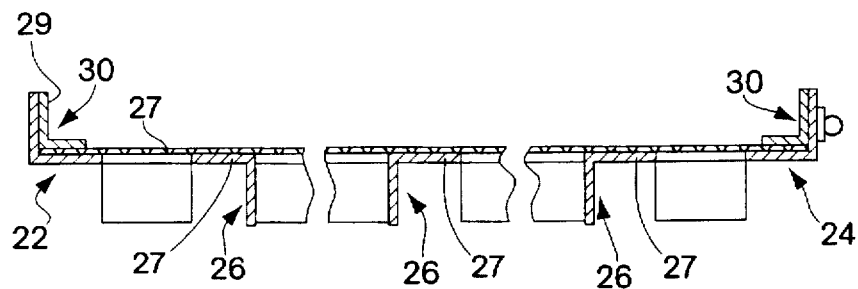
FIG. 4 is a fragmentary cross-sectional view of one ramp section, taken along the section line 4—4 in FIG. 3.

While the three ramp sections shown in FIGS. 2 and 3 appear to be the same length, in accordance with the present invention, the ramp sections are manufactured in a variety of lengths, particularly in lengths of three and six feet which can be combined in any sequence to accommodate the particular setting in which the ramp system is erected. The ramp sections, regardless of their length, are each made of a frame 20 having a number of a steel angle members and a steel mesh grate 28, the latter forming the upper surface of the ramp section. As shown in FIG. 4, the frame 20 of the ramp section comprised of the various angle members includes a pair of side angle members 22 and 24 that extend longitudinally of the section and three inside longitudinally extending angle members 26. The horizontal faces 27 of each of the angle members 22, 24, and 26 are welded to and support the steel grate 28, and a pair of additional inside angles 30 are welded to the inner vertical faces 29 of the side angle members 22 and 24 and to the upper surface of the grate 28. The angles 30 serve to stiffen and strengthen the ramp sections and retain the longitudinal edges of the grate 28 in position. A cross angle member 32 is shown incorporated into each frame 20 in FIG. 3 to further rigidity and strengthen the ramp section. The cross member 32 may be omitted in three feet long ramp sections.

Figure 5:
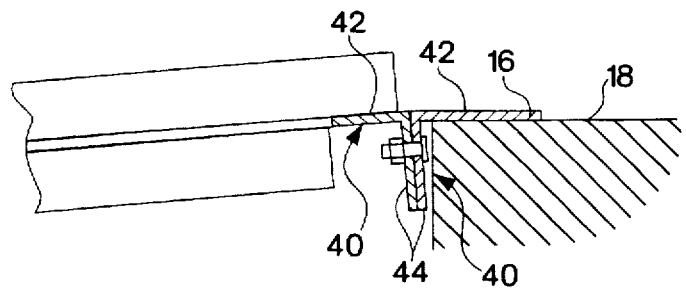
FIG. 5 is a fragmentary cross-sectional view showing the upper end of the ramp system taken along section line 5—5 of FIG. 3.
Figure 7:
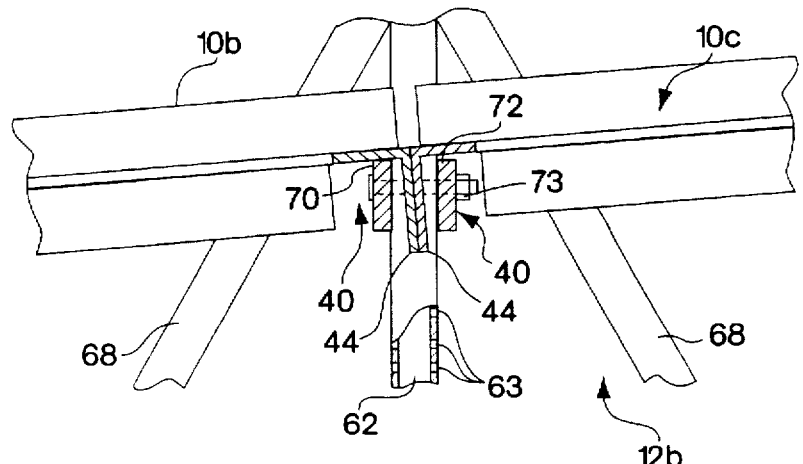
FIG. 7 is a fragmentary cross-sectional view showing the manner in which adjacent ends of two ramp sections are assembled end to end on a stand and taken along section line 7—7 in FIG. 3.

In FIGS. 1, 5, and 7, it will be noted that the ends of each frame 20 of a ramp section is also defined by an angle member 40 that has a horizontal flange 42 that is co-planar with the horizontal flanges of the other angle members of the frame and a downwardly extending flange 44 that is substantially longer than the vertical flanges of the other angle members 26 that extend longitudinally of the frame. The flange 44 of angle member 40 serves as a mounting bracket to secure the end of the ramp section to the stand 12.

In FIG. 1, the stand 12 is shown in detail. The stand includes a rectangular base 50 made of parallel side angle members 52 and 54 connected by transverse cross-bars 56 and 58. A pair of parallel vertical side posts 60 and 62 made of square tubular steel stock are welded at their bottoms to side angle members 52 and 54, respectively of the base frame 50. As is evident in FIGS. 1 and 7, the square posts 60 and 62 have a series of equidistantly spaced through holes 63 extending parallel to the side frame members 52 and 54. The posts 60 and 62 are supported at the top by a pair of downwardly diverging braces 66 and 68, respectively, welded to the tops of the posts and to the corners of the base frame 50. The braces 66 and 68 may be made of angle members like side member 52 and 54 or have any other suitable configuration which provides adequate strength to stiffen the stand assembly 12.

As shown in FIGS. 1 and 7, a pair of cross rails 70 and 72 are fastened to the posts 60 and 62 are provided to support the adjacent ends of two ramp sections 10 by engaging the vertical flanges 44 of the angle members 40 of the ramp sections. The height of the adjacent ends of the ramp sections may be adjusted by attaching the rails 70 and 72 together to different holes in the posts 60 an 62. In FIG. 7, a bolt 73 is shown to extend through holes in the rails 70 and 72 and through the holes 63 in the post 62 to secure the rails in position. To support the ends of the ramp sections on the stand, the vertical flanges 44 of the angle members 40 are hooked over the cross rails 70 and 72 and extend downwardly between the two rails, as is clearly shown in FIG. 7.

It will be noted in FIG. 2 that the stands 12a and 12b support the adjacent ends of ramp sections 10a and 10b and 10b and 10c, respectively, at different elevations. The stands shown are of the same height but the rails 70 and 72 in stand 12a are mounted lower than the rails in stand 12b. Thus, simply by adjusting the height of the rails 70 and 72 on the vertical posts of the stands, the height at which the adjacent ends of the ramp sections carried by the stand may be varied.

Figure 8:
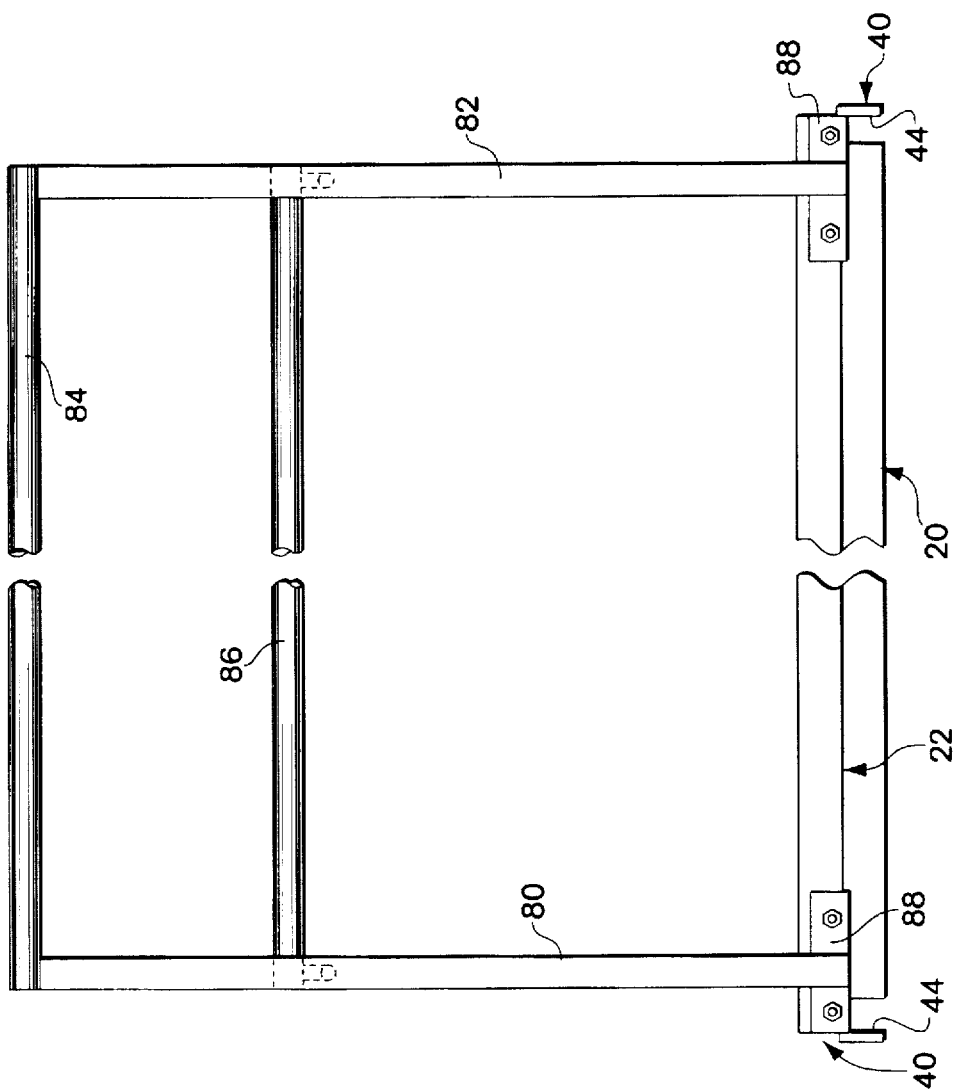
FIG. 8 is a side elevation view of a ramp section and handrail in accordance with the present invention.
Figure 9:
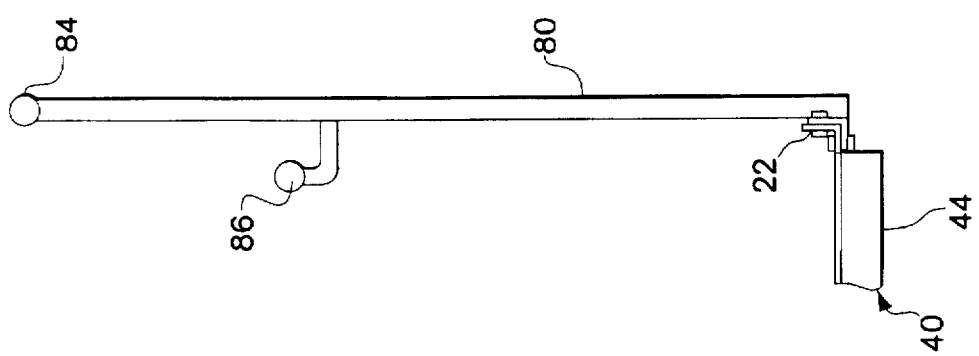
FIG. 9 is an end view of the handrail and ramp section shown in FIG. 8.

For certain applications of the ramp assembly, it is desirable to provide hand rails along with the sides of each ramp section, and a preferred form of railing for that purpose is shown in FIGS. 8 and 9. The railing illustrated is composed of a pair of vertical end posts 80 and 82 having upper and lower tubular handrails 84 and 86. The bottoms of the vertical posts 80 and 82 carry angle brackets 88 that are shown bolted to the side angle member 22 of the ramp section frame 20. Holes may be provided in the longitudinally extending side angle members 22 and 24 to receive the bolts that attach the brackets 88 to them. As illustrated, the lower handrail 86 is disposed inwardly of the plane of the end posts 80 and 82. Typically, the post 60 and 62, may be approximately 35 inches tall so as to support the upper and lower handrails 84 and 86, approximately 35 and 20 inches, respectively, above the deck 28 of the ramp section to which the railings are attached. Ordinarily, if railings are desirable in an installation, each section would be provided with railings on both sides thereof.

From the foregoing description, the versatility and ease of assembling the ramp will be appreciated. In FIGS. 2 and 3, the assembly is shown to provide a ramp having a very gradual incline from a walkway to the top of a flight of three steps to the landing 18. The assembly is made up of three ramp sections with one end of ramp 10a being provided with a transition flange 14 to make it easier for a wheelchair or other wheeled device to roll onto the ramp. The upper end of ramp section 10c is provided with a transition flange 16 that engages the upper surface of the landing 18 so as to enable the surface of the ramp assembly to merge smoothly with the landing. The transition flange 16 also serves to support the upper end of the ramp section 10C.

Two stands 12a and 12b are used to support the three ramp sections 10. The stands are assembled with their rails 70 and 72 at the selected height and thereafter ramp section 10a is lifted by means of the handles 90 on the sides of the section so that the end of the section 10a rests on the rail and the vertical flange 44 of angle member 40 is hooked over the rail 70. The flange 44 obviously prevents the ramp section 10a from sliding off the rail 70. Next, the ramp section 10b is lifted by its handles 90 and the angle flanges 44 on its end are in placed in position on the rails 72 and 70 of the stands 10a and 10b, respectively. When so assembled, the flanges 44 of the adjacent ends of adjacent ramp sections lie essentially in face to face contact with one another. While ordinarily no fasteners are required to retain the, two flanges together because the ramp sections are held in place by their own weight and the engagement of the flanges 44 behind the rails, in certain installation, the flanges 44 together may be desirable in which case, a clamp (not shown) may be used or holes may be provided in the flanges 44 and bolts passed through them to secure the two in face to face relationship. Finally, the ramp section 10c is placed in position with its flange 44 engaging the rail 72 of stand 12b and the transitional flange 16 is placed on the surface of the landing 18.

Figure 6:
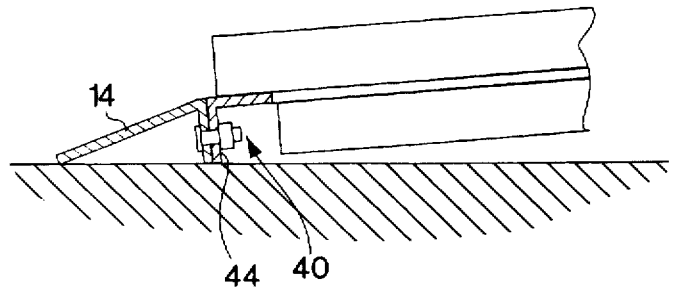
FIG. 6 is a fragmentary cross-sectional view of the lower end of the ramp system taken along the section line 6—6 of FIG. 3.

As shown in FIGS. 5 and 6, the transition flanges 14 and 16 are each made of angle irons which are bolted to the flanges 44 of the angle members 40 of their respective ramp sections. For that purpose, holes are provided in each of the flanges 44 so that the end of a ramp section which is to serve as the end of the ramp system may have a transition flange bolted to it. The same holes which enable the transition flanges 14 and 16 to be attached to the flanges 44 may also be used to secure adjacent flanges 44 of two ramp sections together on the stand 12. If a particular application requires the use of railings, the railings as shown in FIGS. 8 and 9 may be added to the assembly either before or after the ramp sections 10 are placed on the stands 12.

From the foregoing description, it will be apparent that the present invention provides a ramp system that may easily be erected in virtually any setting and in any length. Because the ramp sections are provided in three and six foot lengths, an array of ramp sections can be selected to fit virtually any particular application, and the entire assembly can be erected with a single wrench. Two people can readily carry a ramp section by means of the handles 90 on each side. The angles along the sides of each ramp section will prevent a wheelchair or other wheeled device from rolling or skidding off the side of the ramp, and the non-skid surface of the deck of each ramp section will prevent a person walking on the ramp assembly from slipping and will also prevent a wheeled device from skidding on it.

Having described this invention in detailed, those skilled in the art will appreciate that numerous modifications may be made of this invention without departing from its spirit. Therefore, it is not intended from the scope of the invention be limited to the single embodiment illustrated and described. Rather, its scope is to be determined by the appended claims and their equivalents.

I claim:

1. A modular ramp system comprising:

a pair of ramp sections, each ramp section including side and end frame members and a deck supported by the frame members, each of the ramp sections including a mounting bracket on at least one end frame member; and a stand including a pair of independently functioning rail, one rail adapted to engage and releasably hold the mounting bracket on one ramp section and the other rail adapted to engage and releasably hold the mounting bracket on the other ramp section, the rails being arranged so that the ends of the ramp sections may be supported and retained closely adjacent one another to substantially reduce the spacing between the ramp sections and form a substantially continuous deck from the one ramp section to the other ramp section.

2. A modular ramp system as defined in claim 1, wherein the height of the rails is adjustable on the stand.

3. A modular ramp system as defined in claim 1, wherein the mounting brackets include downwardly extending flanges on the frame members.

4. A modular ramp system as defined in claim 3, wherein the rails are disposed under the ends of ramp sections and hold the mounting brackets of the ramp sections in place.

5. A modular ramp system as defined in claim 1, wherein the deck on each ramp section includes an open mesh surface.

6. A modular ramp system as defined in claim 1, wherein the stand includes a pair of spaced apart vertical posts the rails being supported between the posts.

7. A modular ramp system as defined in claim 6, wherein the rails are connected to opposite sides of the posts.

8. A modular ramp system as defined in claim 6, wherein the rails are adjustably supported along the height of the posts.

9. A modular ramp system as defined in claim 8, wherein each post has a vertical row of openings extending over a substantial portion of its height, and the rails are attached to the post by fasteners that extend through the opening in the posts.

10. A modular ramp system as defined in claim 6, wherein the stand includes braces constructed and arranged to support the posts.

11. A modular ramp system as defined in claim 10, wherein the stand includes a base, the braces extending upwardly from the base and being secured to an upper portion of the posts.

12. A modular ramp system as defined in claim 1, wherein the ramp section include upwardly extending wheel rails disposed along the length of the side frame members for preventing a wheelchair from rolling off the side of the ramp section.

13. A modular ramp system as defined in claim 1, wherein the ramp sections include carrying handles secured to the frame members for enabling them to be carried and mounted on the stand.

14. A modular ramp system as defined in claim 1, wherein the rails are spaced apart so that the mounting brackets lie essentially in contact with one another when supported on the rails.

* * * * *